United States Patent [19]

Huang

[11] Patent Number: 5,096,312
[45] Date of Patent: Mar. 17, 1992

[54] PASSIVE FIBER-OPTIC POLARIZATION CONTROL ELEMENT

[76] Inventor: Hung-chia Huang, Jiang Ning Road, Lane 83, No. 4, Suite 404, Shanghai, China

[21] Appl. No.: 540,786

[22] Filed: Jun. 20, 1990

Related U.S. Application Data

[63] Continuation-in-part of Ser. No. 310,872, Feb. 16, 1989, Pat. No. 4,943,132.

[30] Foreign Application Priority Data

Oct. 23, 1988 [CN] China .................................. 88107389

[51] Int. Cl.$^5$ .............................................. G02B 6/16
[52] U.S. Cl. .......................................... 385/11; 385/123; 359/485; 359/488
[58] Field of Search .............. 350/96.15, 96.13, 371, 350/389, 400

[56] References Cited

U.S. PATENT DOCUMENTS

| | | | |
|---|---|---|---|
| 4,389,090 | 6/1983 | Le Fevre | 350/96.29 |
| 4,729,622 | 3/1988 | Parlath | 350/96.15 |
| 4,793,678 | 12/1988 | Matsumoto et al. | 350/96.15 |
| 4,801,189 | 1/1989 | Shaw et al. | 350/96.15 |
| 4,943,132 | 7/1990 | Huang | 350/400 |

OTHER PUBLICATIONS

"Weak Coupling Theory of Optical Fiber and Film Waveguides" Huang, Radio Science vol. 16 #4, pp. 495–499, 1981.
"Coupled Modes and Nonideal Waveguides", Huang, Microwave Research Institute, Polytechnic Institute of New York, 1981.

*Primary Examiner*—John D. Lee
*Assistant Examiner*—Stephen W. Barns

[57] ABSTRACT

A fiber-optic fabrication method is used for making the passive fiber-optic polarization control element capable of transforming an arbitrarily oriented linear polarization of light to a desired specific orientation, as so predicted by the super-mode theory. Central to this method is to locally heat and spin an anisotropic optical fiber with a variable spinning speed which is sufficiently high initially and which, as the micro-heater moves along the length of the fiber, drops slowly and monotonously to zero in a total length of about $10^2$ times the unspun-state beat length of the anisotropic fiber. Moreover, a linearly polarized light of definite, not unpredictable orientation, can be transformed simply with the aid of a half-wave plate, for example, to other desired SOPs (states of polarization) at the output.

9 Claims, 5 Drawing Sheets

PASSIVE FIBER-OPTIC POLARIZATION CONTROL ELEMENT

This application is a continuation-in-part application of the U.S. application Ser. No. 07/310,872, filed Feb. 16, 1989, allowed Jan. 30, 1990, now U.S. Pat. No. 4,943,132.

FIELD OF THE INVENTION

This invention relates to polarization optics of single-mode optical fiber, polarization control in coherent optical communication and other polarization-dependent fiber-optic systems.

BACKGROUND OF THE INVENTION

While various schemes have been devised, and trial systems advanced over the past decade, or so, in achieving polarization control for coherent optical communication or other polarization-dependent fiber-optic systems, a scheme which is entirely free of manual adjustment as required in any practical application did not exist until the invention of the U.S. Ser. No. 07/310,872 entitled "Passive Fiber-Optic Polarization Control now U.S. Pat. No. 4,953,132.

In this invention, there was described a new all-passive polarization control scheme which is entirely manual-free, and hence immediately applicable to practical systems requiring a well-defined linear polarization orientation. A method of fabricating the invented passive polarization-control device was exposed, which is to variably spin the preform of appropriate birefringence with a spinning speed droping slowly and monotonously from a sufficiently high value to zero.

The present continuation-in-part application of the U.S. Ser. No. 07/310,872, now U.S. Pat. No. 4,953,132 represents an alternative technological approach to the fabrication of the invented all-passive polarization-control device. Peculiar to this approach is to use a length of birefringent optical fiber, not a specialized preform, as the starting substance, and to make the polarization-control element by locally heating and spinning the fiber with a variable speed which is sufficiently high initially, and which drops slowly and monotonously to zero while the micro-heater moves linearly along the length of the optical fiber.

Besides the dominating advantage of manual-free operation, the invented fiber-optic element/device is advantageous in small size and light weight, in structural simplicity and operational dependability, in low-cost, among others. The price paid for all these advantages is a power penalty of 3 dB. From the power-budget point of view, this generally will not pose a problem, as coherent optical communication systems are capable of improving the sensitivity of the present-day direct-detection receiver by 15–20 dB. In view of the current line of though that coherent optical systems may prove useful also in local networks, where the primary interest is in the multiplexing possibility, while providing a useful increase in power-budget, the present invention adopting the passive-device approach is apparently superior.

SUMMARY OF THE INVENTION

In the present application, a simple and low-cost technological method for fabricating the invented passive fiber-optic polarization-control element is disclosed. The method uses a length of fiber of appropriate birefringence, about $10^2$ times the unspun-state beat length of the fiber, as the starting substance. The fiber is locally micro-heated by a micro-heater, and is spun at a variable speed while the micro-heater, traverses a required length of the fiber. The spinning speed starts at a sufficiently high initial value, such that the initial spun pitch is 0.1 times the beat length of the birefringent fiber at its unspun state, and then the spinning speed drops gradually and smoothly to zero according to a monotonously decaying but otherwise arbitrary function, as the micro-heater completes its linear motion covering about $10^2$ times the unspun beat length of the birefringent fiber. Alternatively, the spinning speed starts at zero initially, and gradually and smoothly increases to a sufficiently high value according to a monotonously rising but otherwise arbitrary function, as the micro-heater completes its linear travel. In either case, the fast-spun end of the resulting fiber element is to be used as the input end, while the non-spun (zero spinning speed) end is to be used as the output end, for polarization-orientation control.

The linear speed of the micro-heater may be kept a constant, for simplicity sake. But a more sophisticated scheme may be devised in which this linear speed gradually and smoothly slow down while the spinning speed rises, or vise versa, resulting in an enhancement of the desired strong local couplings at the input end.

The variable spun-pitch fiber-optic element thus fabricated by a moving micro-heater, like that produced by variably spinning a birefringent preform while the fiber is being drawn, possesses the function of transforming an unpredictable/random linear polarization orientation into a desired specific orientation, as predicted by the super-mode theory.

In addition to the above more fully discussed property of the invented passive polarization control element, the super-mode theory also predicts, within the same theoretical frame-work, another useful property of the same fiber element. This is not to control an unpredictable/random polarization orientation, but to change or transform a definite linear polarization at the input end of the invented element to other SOPs (states of polarization) at its output. The linearly polarized light of a definite orientation is injected onto the input end of the invented element via a half-wave plate, for example, whose rotation results in a change of the input orientation angle. A rotational range of $\pm 0.25\pi$ of the half-wave plate, equivalent to a rotational range of $\pm 0.5\pi$ of the input orientation, will cover a continuous transformation of the input linearly polarized light of specific orientation into a right or left-handed elliptically polarized light of a desired degree of ellipticity, including linearly polarized and right/eft handed circularly polarized light as special cases, at the output of the invented fiber element. A convenient and simple continuously adjustable fiber-optic polarization transformer or convertor is thus easily structured, which delivers output light of all the SOPs that are oriented with major and minor axes bisecting the right angles (90°) of the local coordinate axes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitive of the present invention, and wherein.

DETAILED DESCRIPTION OF THE INVENTION

Figure 1:
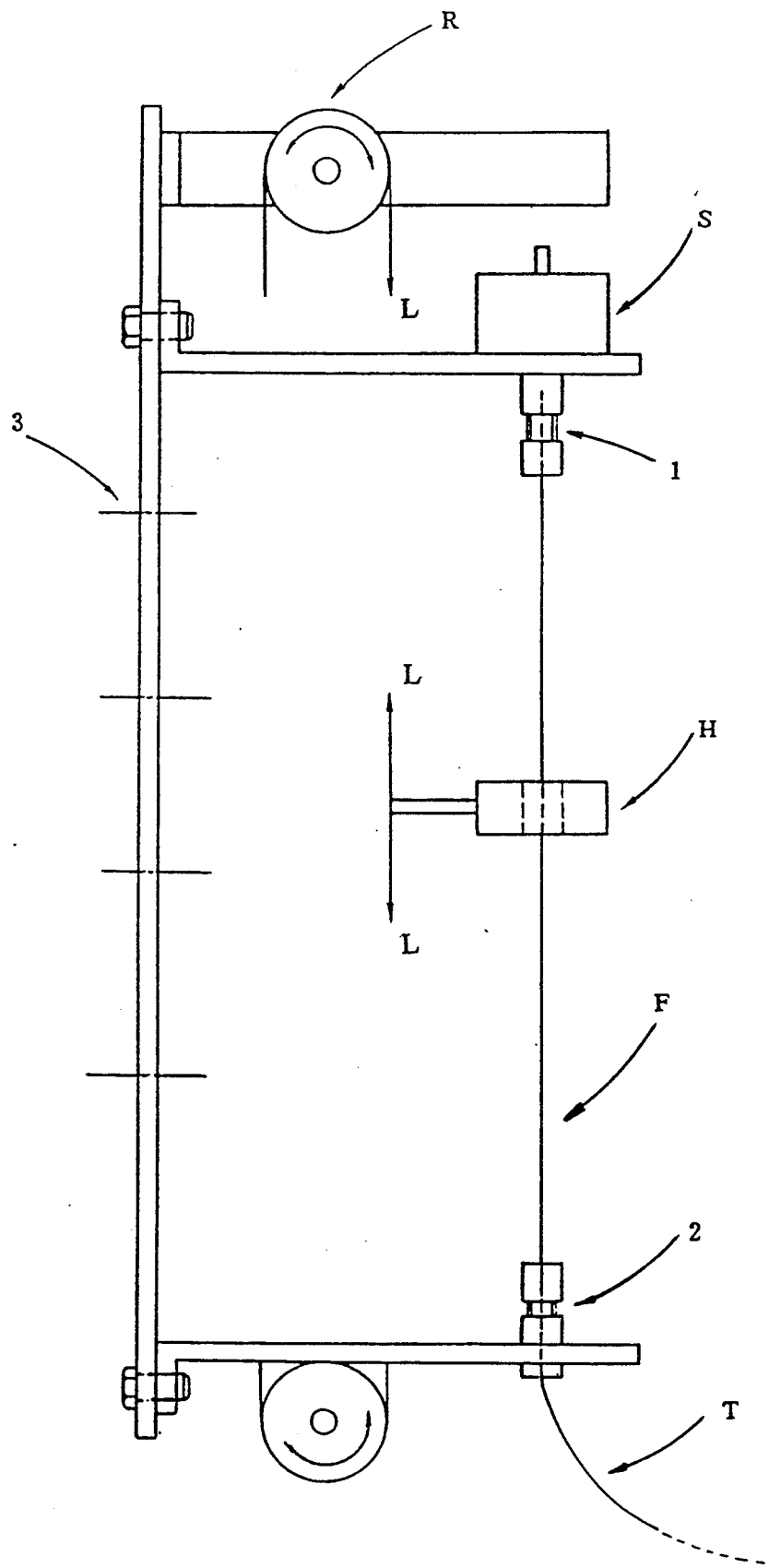
FIG. 1 is a schematic drawing of the apparatus/equipment specially structured for this continuation-in-part of the invention, using the "moving micro-heater technique" for fabricating the invented passive fiber-optic polarization control element.

The passive fiber-optic polarization control device/element disclosed in the application Ser. No. 07/310,872, now U.S. Pat. No. 4,953,132 and herewith in the Continuation-In-Part, is unique, as it is capable of transforming all-automatically, without the need of any manual adjustment, a linearly polarized light whose orientation is unpredictable to a linearly polarized component of light with a definite orientation. It is known that there are a great number of coupling mechanisms and mode-conversion techniques and tricks, which can change an input mode (whether ideal mode, local mode or super mode) into a desired output mode, either via interference effect in a constant-coupling system, or via mode-warping in a variable-coupling system. But in all previously treated problems, the input mode is invariably given as one whose characteristics is all known. The unique feature of the present invention is that it deals with something which is unpredictable. The relevent coupled mode equations with variable coefficients to describe the coupling phenomenon in the invented device/element are awful looking and difficult to solve analytically. It is by mere fortune that asymptotic solutions of these equations can be found which appear admirably simple and prove very useful. With reference to the Pending patent of Ser. No. 07/310,872, the amplitudes of the two orthogonal local modes $A_x(z)$ and $A_y(z)$ at $z = L$ converge asymptotically for large L to the following expressions:

$$|A_x(L)|^2 \simeq |A_y(L)|^2 \simeq 0.5 \quad (1)$$

with the phase difference between $A_x(L)$ and $A_y(L)$ expressed asymptotically by:

$$\Omega(L) \simeq 2\theta + \pi/2 + \int_0^L q\, dz \quad (2)$$

where $\theta$ is the orientation angle of the input linearly polarized light, and the structural parameter $q(z) = \pi[1 + 4Q^2(z)]^{\frac{1}{2}}$, with Q(z) denoting variation of coupling capacity with z.

The absence of $\theta$ in Eq.(1) reveals the equal-power-division property of the invented fiber-optic device/element. Thus, the invented fiber element is capable of delivering two stable orthogonal linearly polarized modes of equal power from an input linearly polarized light whose orientation is unpredictable, or delivering one desired linearly polarized mode power by removing the undesired orthogonal mode.

The appearance of $\theta$ in the phase expression, Eq.(2), reveals that the resulting output light of the invented fiber-optic element can take any SOP depending on the phase difference $\Omega(L)$, which varies only with $2\theta$, the other two terms in Eq.(2) being constant for given L. This suggests another application of the invented fiber-optic element. Thus, given a specific input linearly polarized light whose orientation is adjustable, say by a half-wave plate, then any SOP with a desired ellipticity, including linear and circular SOPs as special cases, can be generated at the output simply by rotating the half-wave plate. The vibrational ellipses to describe the output SOPs are all inscribed in a square whose sides are parallel to the local coordinate axes (x,y) and whose lengths are unity because of the normalization implied in Eq.(1). The major and minor axes of such ellipses lie along the two diagonals of the unit square.

Let the angular reading of the half-wave plate corresponding to linear SOP at the output be denoted by $\xi_o$, and let the major and minor semi-axes of the vibrational ellipse generated at the output as a result of rotation of the half-wave plate from $\xi_o$ to $\xi_o + \Delta\xi$ be denoted by a and b, respectively, then the following relation holds:

$$\Delta\xi = 0.25 \text{ arc } \cos\{[1-(b/a)^2]/[1+(b/a)^2]\} \quad (3)$$

In the special case of linear SOPs, (b/a) = 0, $\Delta\xi = \pm 0.5 n\pi$, n = 0, 1, 2 ..., while in the other special case of circular SOPs, (b/a) = 1, $\Delta\xi = 22.5° \pm 0.5 n\pi$, n = 0, 1, 2 .... The angular range of $\Delta\xi$ between 0° and 22.5° covers the range of all the (b/a) values of the output vibrational ellipses inscribed into a unit square. Any desired (b/a) associated with a vibrational ellipse can be obtained by simply rotating the half-wave plate by a corresponding angle. Thus, the invented fiber-optic element can be used to structure a continuously adjustable polarization state transformer or generator as hereabove described.

As is clear from the application Ser. No. 07/310,872, now U.S. Pat. No. 4,953,132 and the present continuation-in-part, central to the invention is the making of a variable spun-pitch birefrigent fiber element. As aforestated, this continuation-in-part of the invention exposes a fabrication technique for the invented passive fiber-optic polarization control element whose peculiar feature is to locally heat and spin a piece of birefringent fiber used as the starting substance of fabrication. FIG.

1 shows a schematic drawing of the apparatus/equipment structure for fabricating the invented element using the "moving micro-heater technique". Interestingly enough, in appearance the apparatus looks very much like a miniature fiber-drawing tower, with everything scaled down to sub-meter dimension. In essence, fundamental differences exist between the apparatus shown in FIG. 1 and a conventional fiber-drawing tower, besides their enormous difference in dimension. One striking pecularity of the present invention apparatus is that the micro-heater is not fixed in place, but moves either upward from bottom to top, or vise versa, as shown in FIG. 1 by the pair of vertical arrows, while the spinner on top the fiber is spinning the fiber's heated local region.

In FIG. 1, F marks a length of birefringent optical fiber used as the starting substance of fabrication. The numerals 1 and 2 are the to fiber-fastener and the bottom fiber-fastener, respectively. These two are similarly structured, except that the bottom one allows the lower part of the fiber to pass through its inside coaxial hole to form a fiber-tail T. A series of holes (numeral 3) drilled on the left-side frame (four in number in the figure, for illustration only) allow different lengths of the starting fiber to be fastened on top and bottom, simply by fixing the arm of the spinner at a higher or lower place. The variable-speed spinner/motor S is speed-controlled so that its speed follows a slowly and monotonously varying function according to FIG. 2. FIG. 1 also includes the mark R symbolically representing a motor-driven roller which transforms rotational motion of the motor to linear motion of the micro-heater; details of such a common mechanism are not shown in the figure, for the sake of simplicity and clarity of figure-representation.

A vertical structure of the apparatus, where the micro-heater moves vertically, is shown in FIG. 1. While it appears also possible to structure the apparatus horizontally with a horizontal linear motion of the micro-heater, the vertical structure is preferred to the horizontal structure in consideration of the effect of gravity on the straightening of the working optical fiber.

Micro-heaters with different heating machanisms have been employed in the fabrication of a number of fiber-optic devices, including in particular a variety of directional couplers. The heated region in making such devices ranges a couple of centimeters at the most. The use of a micro-heater to work for a length of optical fiber extending up to a few dozens of centimeters long represents a fabrication technique in fiber optics which was not attempted until the present invention. The heating and spinning process in the course of fabrication of the invented fiber-optic element needs re-coating of the naked fiber, just like the case of fabricating directional couplers by a micro-heater, where the region having undergone the process of heating and stretching is re-coated. In the latter case, re-coating of the heated region would introduce modifications of the performance of the directional couplers with naked fibers, so that technological amendments are generally required to have the original performance recovered. Fortunately enough in the present invention, the re-coating process does not change the polarization control performance, even though the heated and spun region is by far longer than the heated and stretched region in directional-coupler fabrication.

The analytic design frame-work for the passive fiber-optic polarization control element using the "moving micro-heater technique" is all the same as the the analytic design frame-work of the same element using the "heating and variably spinning the preform" technique having been discussed in U.S. Pat. No. 4,953,132. Most of the design curves are the same for both techniques, with the linear fiber-drawing speed referring to the technique using a preform as the starting substance corresponding to the linear moving speed of the micro-heater technique using a length of optical fiber as the starting substance. The design starts with a specification of the spinning speed $\tau$ or the coupling capacity Q associated with the two orthogonal local modes, as a function of the transmission coordinate z.

Figure 2:
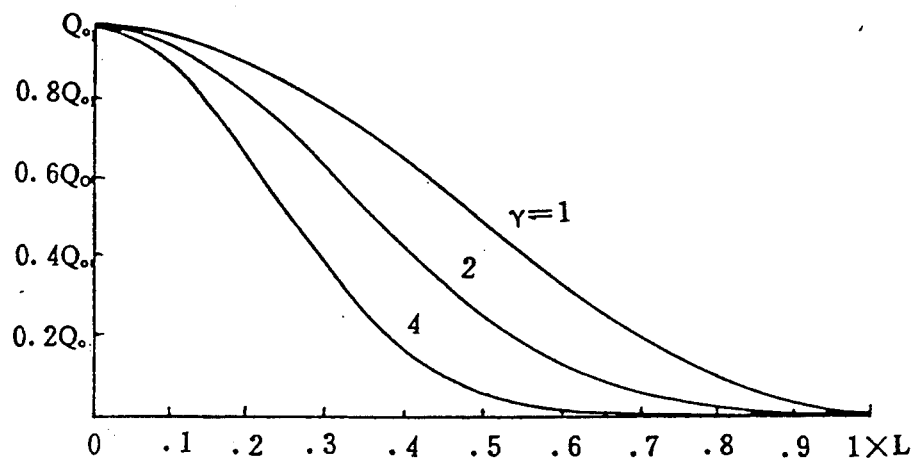
FIG. 2 shows a set of curves which simulates the monotonously decaying function for the coupling parameter Q, or for the varying rotational speed of the spinner.

FIG. 2 shows a set of functions which simulates variation of the coupling capacity Q along the fiber length z:

$$\tau \sim Q = Q_o[0.5 + 0.5 \cos(\pi z/L)]^\gamma \qquad (4)$$

where $Q_o$ is taken to be equal to or larger than 10, and L, the total length of the fiber element normalized with respect to the beat length of the birefringent fiber at its unspun state, is taken to be about $10^2$. The parameter $\gamma$ governs the pattern in which the Q- or $\tau$-function slopes down from a maximum value to zero.

Figure 3:
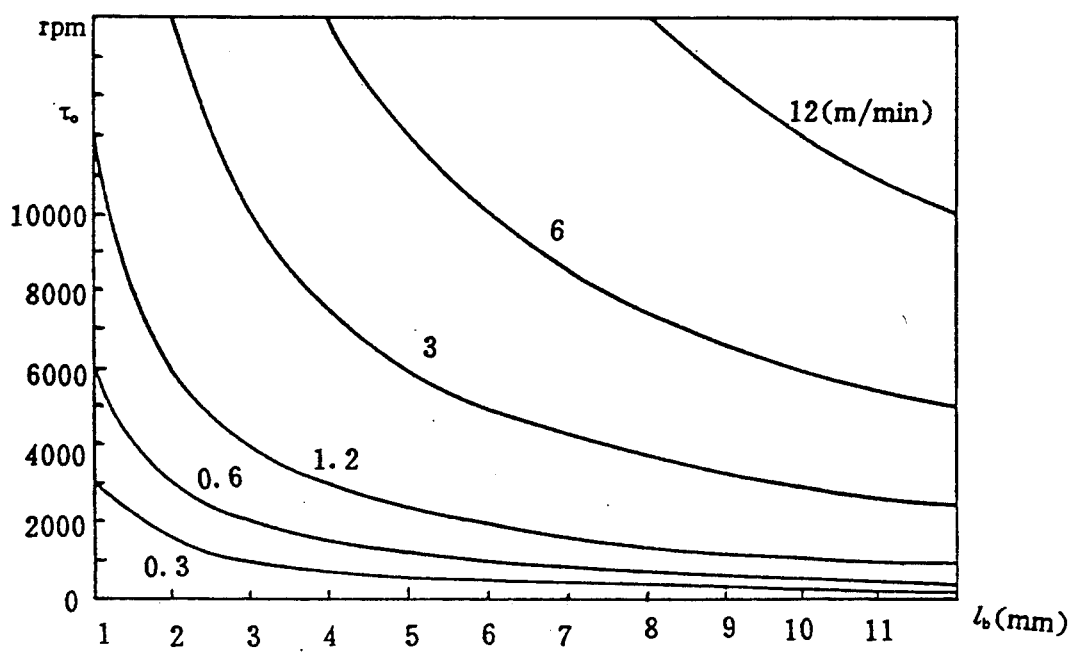
FIG. 3 is a diagram showing appropriate combinations of the required values of the pertinent parameters for making the fiber-optic element, where the numbers marked besides the curves denote linear moving speeds of the micro-heater.

Appropriate combination of the values of the pertinent parameters for practical device-making are shown in FIG. 3. The required initial spinning speeds as marked on the ordinate of the diagram are for $Q_o = 10$. For larger $Q_o$, the value of the initial spinning speed is called up proportionally. The abscissa indicates readings of the beat length of the birefringent fiber at its unspun state. The numbers marked besides the curves denote linear moving speeds of the micro-heater.

Figure 4:
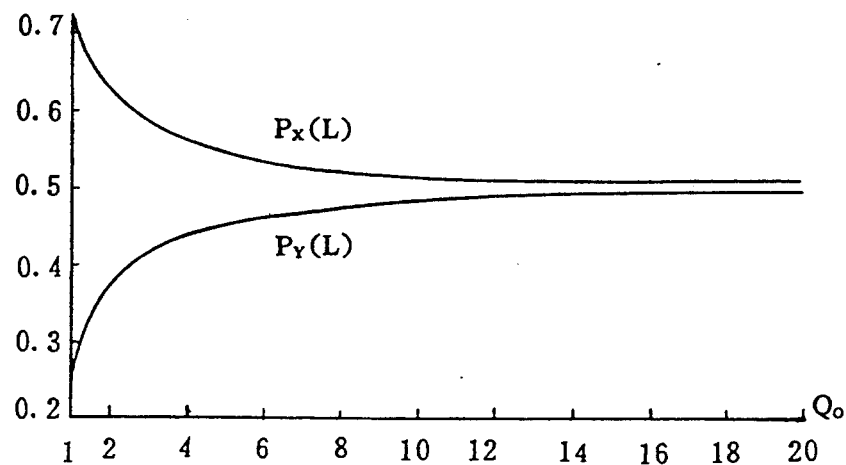
FIG. 4 shows the effect of the initial coupling capacity $Q_o$ in achieving the required eventual state of equal power division between the two orthogonal polarized modes.
Figure 5:
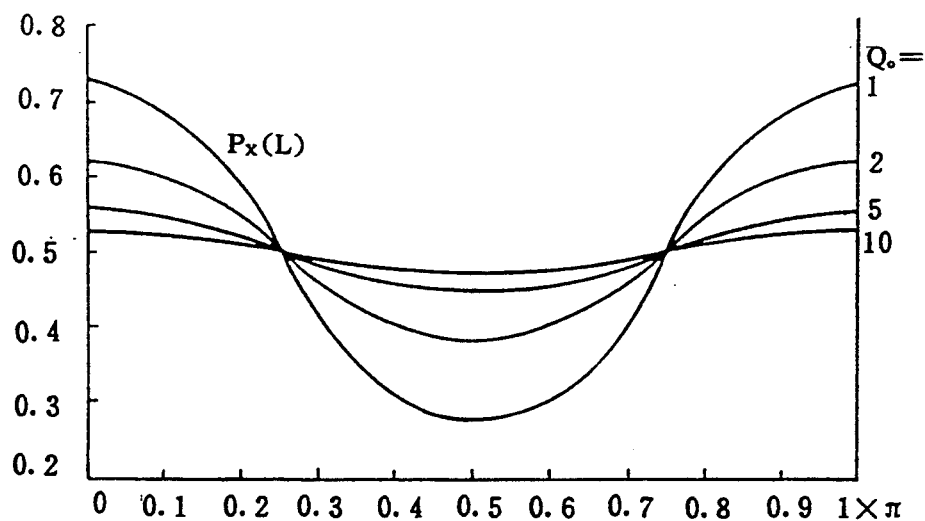
FIG. 5 shows the power output $P_x$ (or $P_y = 1 - P_x$) versus the input polarization orientation angle, for different $Q_o$.

The initial coupling capacity $Q_o$ is a crucial parameter in the design frame-work. FIGS. 4 and 5 show how increase of $Q_o$ improves the performance of almost equal division of power, and the almost constancy of the output power $P_x$ (or $P_y = 1 - P_x$), respectively. For both figures, L is taken to be $10^2$.

Figure 6:
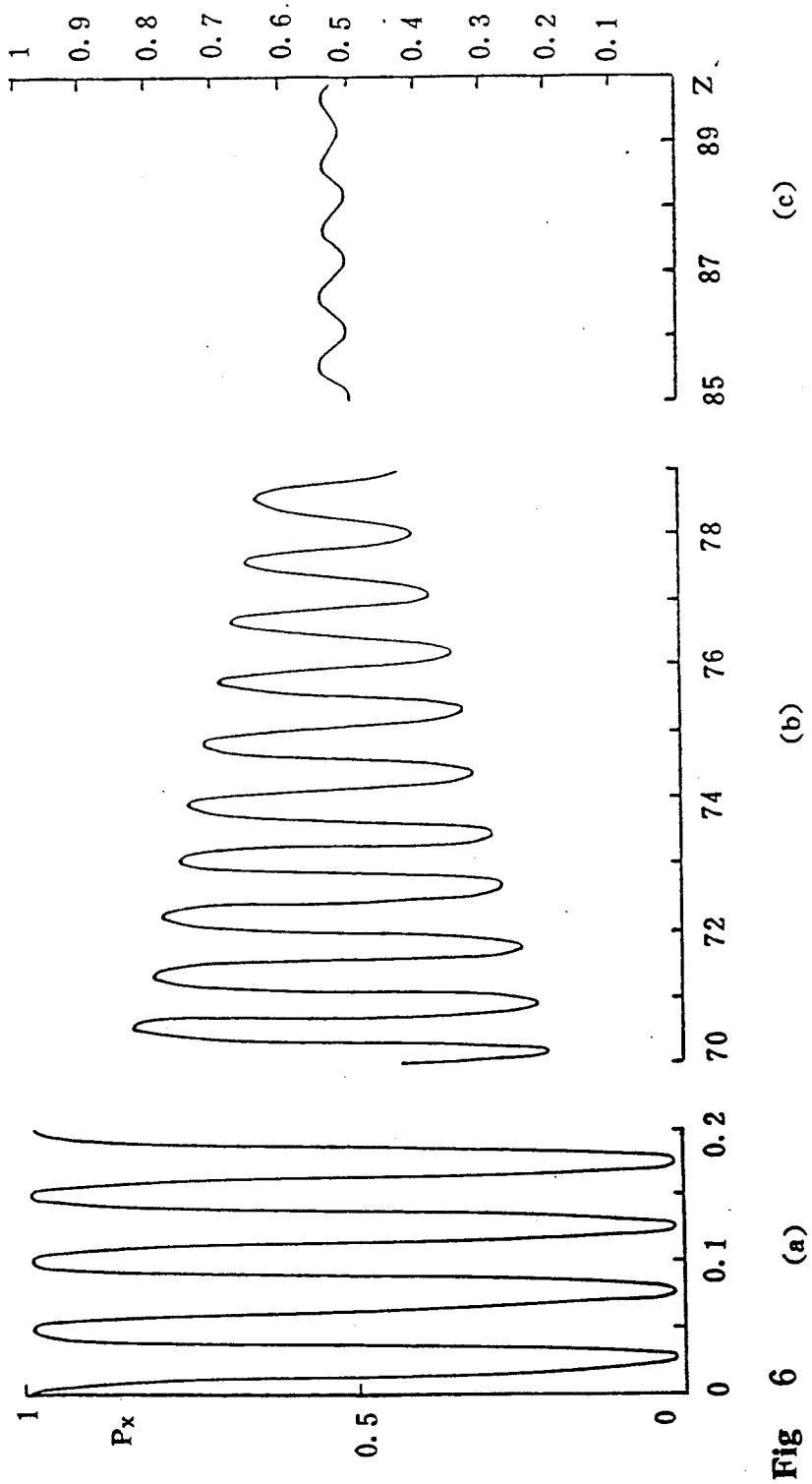
FIG. 6a, b, c show the evolution of $P_x$ or $P_y$ in the initial, intermediate and final portions of the fiber-optic structure.

Evolution of the moder power along the fiber length is shown in FIG. 6. Initially, in section (a), an almost complete power transfer takes place swiftly back and forth from one local mode to the other. This almost complete power conversions-reconversions decay gradually through the intermediate section (b), which is featured by a transition from strong coupling to weak coupling of the local modes. The end section (c) is featured by a weak coupling between the local modes carrying almost equal powers, with rise and fall vanishing gradually towards the output end. The higher the value of the initial coupling capacity $W_o$, the less the eventual deviations of the two mode powers from 0.5 will be. The parameters used for FIG. 6 are $\gamma = 2$, $Q_o = 10$, $L = 10^2$.

Figure 7:
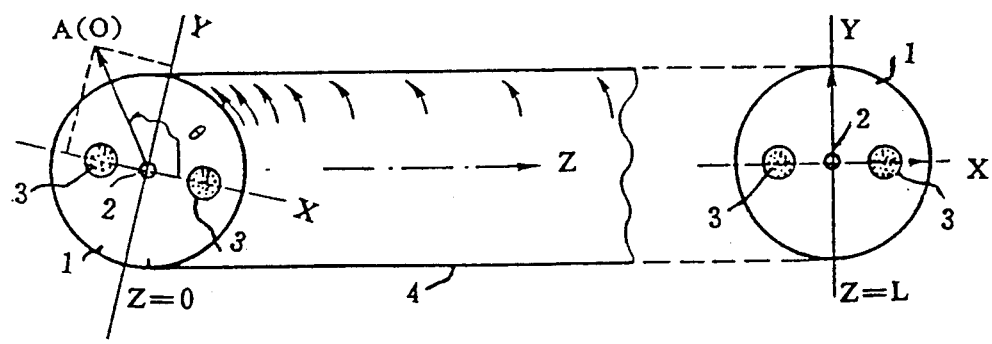
FIG. 7 is a schematic drawing of the fiber-optic structure which performs the equal power-devision function.

FIG. 7 is a schematic drawing of the fiber structure which performs the equal power-division function. In the figure numeral, 4 is a birefringent optical fiber whose unspun-state beat length is appropriately chosen according to the specifications indicated in FIG. 3. The marks 2 and 3 denote the fiber core and the stres-applying regions, respectively. Isolated stress-applying regions are shown in FIG. 7, but fibers of other versions will make no difference. FIG. 7 shows that the fiber is made with a fast initial spinning, which gradually slows down along the fiber length. FIG. 7 also includes an input linear polarized light A(O) at $z = 0$, which is arbitrarily oriented, achieving a state of almost equal power division at the output end $z = L$.

In actual application, the output end of the fiber element hereabove described is spliced with a polarizer or with one appropriate terminal of a polarization-dependent direction coupler. An alternative scheme is to make use of the well-established bending technique to perform the polarization function. The entire polarization-control device can be thus made from a single piece of optical fiber without a splice. This is achieved by using a longer piece of birefringent fiber as the starting substance, with a part of the fiber about $10^2$ unspun-state beat-length long to be micro-heated and spun to yield the power equal-division element, and with the rest of the fiber, in the form of a tail of the fabricated fiber element, to be wound afterwards to perform the bending-induced polarizing function. The advantage of this scheme is to eliminate one splice otherwise necessary between the power-equalization element and the polarizing element. The disadvantage of this scheme is its less freedom in the choice of the value of the beat length which is now required not only to suit the initial conditions specified in FIG. 3, but also the special conditions necessary for the making of the desired bending-produced polarizer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A passive fiber-optic element whose cross-sectional or transverse structure varies longitudinally along the length of the element in such a way that the transverse structure at the input end is quasi-isotropic, the transverse structure at the output end is anisotropic having two preferred orthogonal modes of polarization, and the transverse structure varies slowly and monotonously from the input end to the output end, thereby generating a function which is to transform an arbitrary/unpredictable linear or quasi-linear polarization of light at the input to two orthogonal linearly polarized modes/components of almost equal power division at the output, or to deliver one stable linearly polarized light at the output with the desired polarization orientation by removing the undesired orthogonally polarized mode/component.

2. A passive fiber-optic element whose cross-sectional or transverse structure varies longitudinally along the length of the element in such a way that the transverse structure at the input end is quasi-isotropic, the transverse structure at the output end is anisotropic having two preferred orthogonal modes of polarization, and the transverse structure varies slowly and monotonously from the input end to the output end, thereby performing the function of a continuously adjustable SOP transformer in the sense that a specific linearly polarized light at the input is transformed, via a rotation of its orientation, to any SOP at the output, with its vibrational ellipse inscribed into a unit square whose sides are parallel to the local coordinate axes, and with a desired ratio of semi-axes associated to the elliptical SOP.

3. A method of fabricating the passive fiber-optic polarization component consisting of spinning an anisotropic optical fiber of appropriate birefringence as the starting substance, which is locally heated by a micro-heater moving along the length of the fiber, with the spinning speed falling slowly and monotonously from a high initial value at the input end to zero at the output end, or alternatively, with the spinning speed rising slowly and monotonously from zero at the output end to a high value at the input end.

4. The fiber-element fabrication method according to claim 3, wherein the ratio of the heat-length of the birefringent fiber used as the starting substance, at unspun-state of the fiber, to the spinning-pitch of the fiber is initially equal to 10 or larger at the input end, and this ratio decreases slowly and monotonously to zero towards the output end.

5. The fiber-element fabrication method according to claim 3, wherein the total length of the fiber-element is about $10^2$ times the beat length of the two orthogonal modes of the anisotropic/birefringent fiber at its unspun state.

6. An apparatus for fabricating the passive fiber-optic polarization control element which consists, essentially, a variable-speed spinner, two fiber-fasteners to fasten the two ends of the length of optical fiber used as starting substance of the fiber element, and a micro-heater moving vertically along the fiber length during the whole interval of the local spinning of the fiber.

7. An all-passive fiber-optic polarization control device comprising two fiber-optic components in series, the first component being a specialized fiber of variable spin-pitch having two preferred orthogonal polarization modes at an output end thereof, the first component being fabricated by locally heating and variably spinning an anisotropic fiber, and the second component being a polarizing element for removing an undesired component of said output light.

8. The all-passive fiber-optic polarization control device according to claim 7, wherein the polarizing element used to remove the undesired component of said output light is a separate polarizer whose input terminal is spliced with the output terminal of said fiber of variable spin-pitch component.

9. The process of making a spliceless all-passive fiber-optic polarization control device according to claim 7, wherein a longer length of birefringent fiber is used as the starting substance, with a part of the fiber about $10^2$ unspun-state beat-length long to be micro-heated and spun to yield the power-equalization element, and with the rest of the fiber, in the form of a tail of the fabricated fiber element, to be wound afterwards to perform the bending-induced polarizing function.

* * * * *